April 18, 1944.  E. C. S. CLENCH ET AL  2,346,823
PROFILE DUPLICATING MACHINE
Filed March 13, 1942  2 Sheets-Sheet 1

Inventors:
E. C. S. Clench
O. H. Carlton
By: Sturms & Davis
Attys.

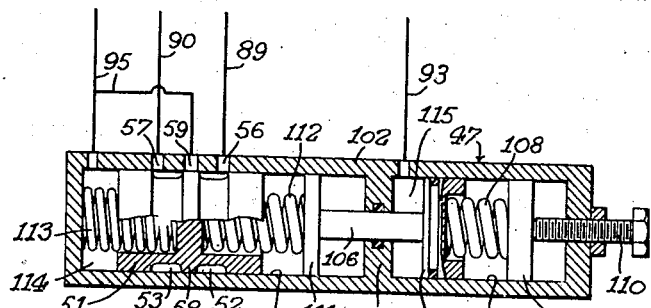

Patented Apr. 18, 1944

2,346,823

UNITED STATES PATENT OFFICE 2,346,823

PROFILE DUPLICATING MACHINE

Edward Claude Shakespeare Clench and Quintin Healey Carlton, Leamington Spa, England, assignors to Automotive Products Company Limited, Leamington Spa, England Application March 13, 1942, Serial No. 434,590
In Great Britain March 17, 1941

7 Claims. (Cl. 90—13.5)

This invention relates to profile duplicating machines of the kind (herein mentioned as the kind referred to) in which the work piece and the pattern or model are mounted so as to be moved in unison relative to a tool and a follower respectively, by means of a double-acting hydraulic motor unit having a pair of working spaces fed with pressure liquid from a supply system through the medium of a valve, which is operated by the follower and which is herein termed the "follower valve." It will be appreciated that the tool and follower may be fixed, or alternatively the work piece and pattern may be fixed.

It is the object of the present invention to provide an improved liquid pressure system for moving the table or the cutting tool in sympathy with movements which are imparted to the follower by the pattern or model, said system being particularly responsive and capable of producing accurate work.

In a profile duplicating machine of the kind referred to, according to the present invention the follower valve controls the flow of pressure liquid to and from only one of the working spaces of the motor unit, and a fluid actuated relay valve which is responsive to pressure changes in said one working space changes the pressure in the other working space of the motor unit, but in the sense opposite to that of the change of pressure in the said one space.

According to a further aspect of the invention, in a profile duplicating machine of the kind referred to the follower valve is arranged to place one working space of the motor unit into communication, either with a source of pressure liquid or with an outlet connection, the liquid in said one working space being connected with a pressure actuated relay valve which is arranged to increase and decrease the liquid pressure in the other working space of the motor unit as the pressure in the said one space decreases or increases, respectively.

There is also provided according to the invention a profile duplicating machine of the kind referred to, in which the follower valve directly controls the flow of pressure liquid into that working space of the motor unit where it urges the work and the tool into co-operative engagement, and liquid pressure in this working space actuates a pressure-sensitive relay valve, which itself controls the liquid pressure in the other working space, the pressure in said other working space being arranged to decrease when that in the said one working space increases, and vice versa.

Preferably the relay valve comprises a piston valve member which is arranged to connect the said other working space of the motor unit either with the pressure liquid supply or with a reservoir, said piston valve member being urged in one direction by a spring, and in the opposite direction by the pressure of the liquid in the said other working space of the motor unit, the said spring conveniently being arranged to urge the piston valve member towards the position in which it connects the said other working space with the reesrvoir. If desired the piston valve member of the relay valve may be urged in opposition to the spring by the fluid pressure which is present in the said other working space. This piston valve member can be urged in opposition to the spring by the pressure of the working liquid in each of the working spaces of the motor unit; thus the piston valve member of the relay valve may be acted upon by a plurality of plunger members, at least one of which is acted upon by the liquid pressure in one working space of the motor unit, and at least another is acted upon independently by the liquid pressure in the other working space thereof.

The motor unit may comprise a cylinder which is arranged with its axis substantially vertical, and which contains a piston, with working spaces below and above said piston, the liquid pressure in the said one working space disposed below the piston being arranged to support the weight of the work and the work-carrying means. The invention is however also applicable where the cylinder axis is disposed other than vertically.

If desired the relay valve may comprise a body having coaxial main and auxiliary cylindrical chambers, the former of which contains a piston valve member, and the latter a piston with a thrust rod extending through a partition between the chambers, a pair of relatively strong coiled compression springs being disposed within the respective chambers with the thrust rod operatively connecting them so that they both urge the piston valve member towards its "on" position against the opposing influence of the pressure in the said other working space of the motor unit, while the liquid in the said one working space of the motor unit is connected with the auxiliary chamber of the relay valve so as to oppose the force imparted to the thrust rod by the spring within said auxiliary chamber. In a somewhat similar manner the follower valve can comprise a body having a bore with three axially spaced ports connected with the supply of pressure liquid, with the said one working space of the motor unit, and with a reservoir respectively, a piston valve member being slidable in said bore and having a pair of recesses or equivalent which are in permanent register respectively with the outer two of the said ports, and the piston valve member being formed, between the recesses or equivalent, with a land having an axial width which is substantially equal to the corresponding dimension of the intermediate port, so that said land substantially closes the port when the piston valve member is in an intermediate position. For convenience in manufacture the intermediate port may be constituted by a plurality of slots which are together very slightly greater in axial width than the width of the land in the piston valve member.

The invention is illustrated by way of example in the accompanying diagrammatic drawings, in which:

Figure 2 is a sectional elevation of the relay valve shown in Figure 1, the valve being drawn to an enlarged scale;

Figure 3 is a sectional plan taken on the line 3—3 of Figure 2;

Figure 4 is a sectional plan taken on the line 4—4 of Figure 2;

Figure 5 is a fragmentary sectional elevation showing in an exaggerated manner the way in which the control ports of the follower valve and the relay valve are manufactured, the piston valve member being indicated in broken lines; and Figure 6 is a sectional elevation of a modified construction of relay valve.

Figure 1:
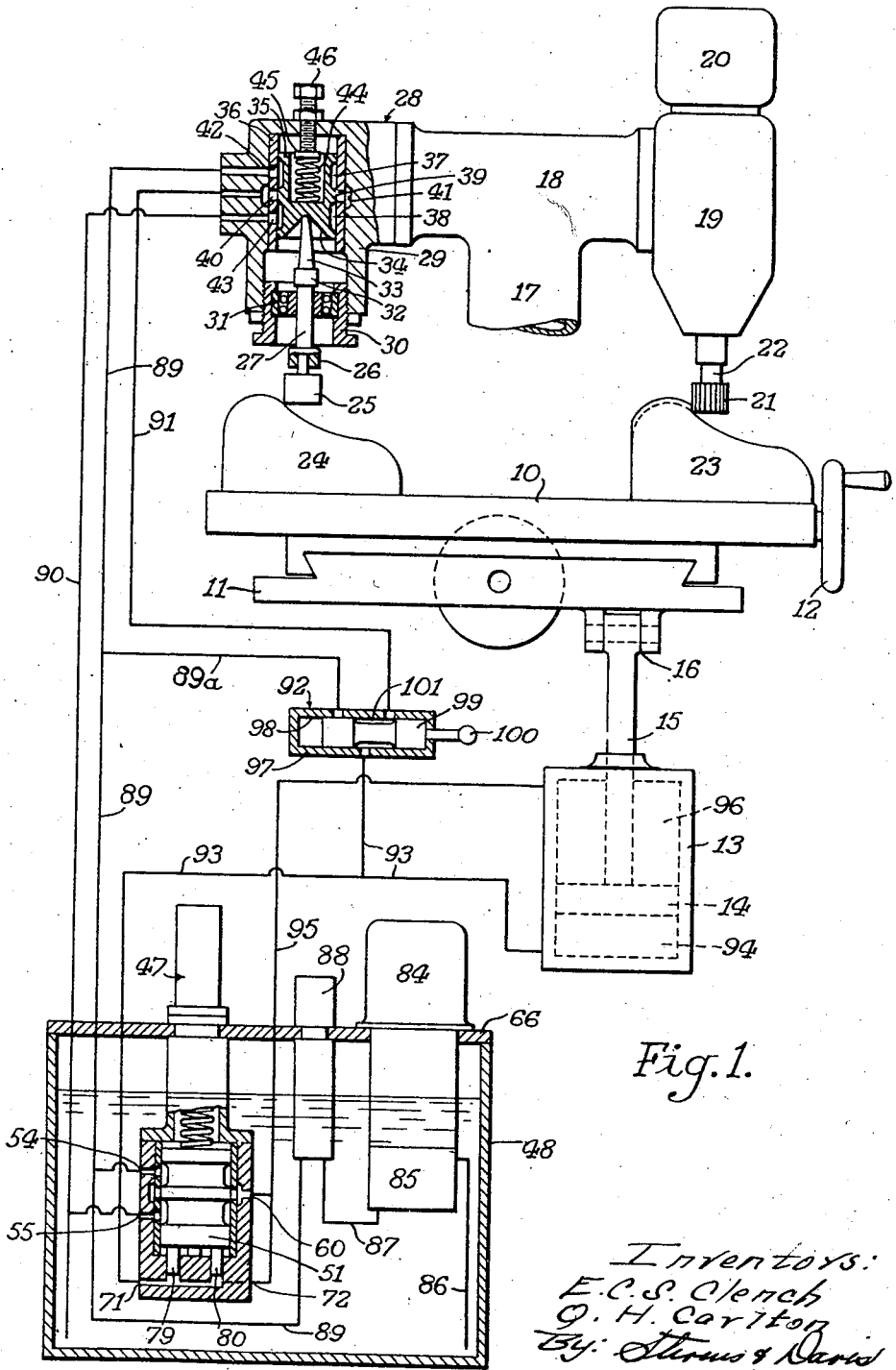
Figure 1 represents in side elevation the relevant parts of a profile duplicating machine, the hydraulic control system being shown together with the connecting pipe lines.

The profile duplicating machine is of the usual construction and has a table 10 carried by a supporting member 11, which latter is mounted upon the body of the machine (not shown) so that it is capable of rising and falling movement. The table 10 is adapted to be both fed longitudinally and traversed relatively to the supporting member 11, the usual longitudinal feed wheel being indicated at 12. A hydraulic cylinder 13 having a double-acting piston 14 is also mounted upon the body of the machine, a piston rod 15 being connected at 16 with the supporting member 11, so that the latter, in company with the table 10, can be moved upwards or downwards by the piston 14, said piston normally bearing the weight of the supporting member 11 and the table 10. A pillar 17 forming part of, or attached to, the body of the machine has a horizontal portion 18, one end of which supports a casing 19 usually containing reduction gearing for connecting the spindle of an electric motor 20 with a milling cutter or like rotary tool 21 mounted upon a spindle 22. As shown, the tool 21 is operating upon a work piece 23, which is clamped to the table 10 in order that its profile may be made to correspond with the shape of a pattern or model 24, also clamped to the table 10. The requisite variations in the "thickness" of the work piece 23 to correspond with the pattern or model 24 are obtained by causing the table 10 to rise and fall as it is moved manually or otherwise in a horizontal plane. This effect is brought about by a follower 25, which can be the same in shape and size as the surface of revolution of the cutter or equivalent 21. If desired, however, the follower can be of a different shape, suitable allowance being made in the shape and/or size of the pattern or model 24. The follower 25 is attached to a holder 26 at the lower end of a rod 27 forming part of a follower valve device, which latter is indicated generally at 28 and is secured as shown to the horizontal portion 18 of the pillar 17.

The follower valve 28 comprises a body 29, into the lower part of which is screwed a tubular bush 30 arranged to carry a ball bearing 31 of the self-aligning type. The rod 27 is freely slidable through the ball bearing 31 and its downward movement is limited by the engagement of a collar 32 with the ball bearing 31, thus enabling the lowermost position of the rod 27, and consequently the follower 25, to be regulated by suitable adjustment of the bush 30. The upper part of the rod 27 is conical, as indicated at 33, and the apex is arranged to engage with a recess 34 formed in a piston valve member 35. This is slidably mounted within a sleeve 36 fitted tightly into the body 29, said piston valve member being formed with a pair of circumferential grooves 37 and 38, leaving between them a land 39. When the piston valve member 35 is in its normal position of equilibrium this land closes, or substantially closes, a port or set of ports 40 formed in the sleeve 36, said port or ports being arranged to be in permanent register with a groove 41 formed in the bore of the body 29. Other ports 42 and 43 in the sleeve 36 are arranged to be in permanent communication with the grooves 37 and 38 respectively. The piston valve member 35 is maintained in engagement with the conical member 33 by means of a coiled compression spring 44 bearing at its upper end against an abutment 45 which is adjustable by means of a bolt 46.

The system also includes a relay valve, which is indicated at 47 in Figure 1, and is for convenience disposed within a container 48 serving as a reservoir for spare working liquid. The construction of the relay valve is shown more clearly in Figures 2, 3 and 4. It comprises a body 49 having a tubular sleeve 50 within which a piston valve member 51 fits slidably, circumferential grooves 52 and 53 in said piston valve member 51 being in permanent communication with connections 54 and 55 by means of ports 56 and 57 respectively in the sleeve. Between the grooves 52 and 53 the piston valve member 51 has a circumferentially continuous land 58, which co-operates with a series of three slots 59 arranged circumferentially, as will be seen in Figure 3, said slots being in permanent communication with a connection 60 owing to the provision of a groove 61 in the body 49. To the upper part of the body 49 a tubular spring housing 62 is secured, this being formed with a tubular spigot 63 which is internally screw-threaded to receive an adjusting screw 64, while the other side of the spigot 63 carries a nut 65 serving to clamp the relay valve 47 on to the lid 66 of the reservoir 48. A cap 67 serves to protect the adjusting screw 64. The lower end of the latter engages an abutment plate 68 bearing against the upper end of a coiled compression spring 69, while the lower end of this spring bears downwards against the piston valve member 51, upon which a locating spigot 70 is provided. The piston valve member 51 needs to be urged upwardly by pressure liquid supplied to a pair of connections 71 and 72 without, however, placing said connections into communication with one another. This is effected by providing in the lower part of the body 49 two pairs of diametrically opposed bores, all four bores being arranged equi-distant from and parallel to the axis of the piston valve member 51. The bores constituting one pair are indicated at 73 and 74, while the other pair is shown at 75 and 76 in Figure 4. The bores are all closed at their lower ends, the pair 73, 74 being in communication with the connection 71 by a passage 77, while a similar passage 78 joins the bores 75, 76 to the connection 72. The bores 73-76 are fitted with corresponding plungers, three of which are shown at 79, 80 and 81 in Figure 2, while the fourth, which is disposed within the bore 76, will be referred to as 82. Each is provided with a depending spigot 83, which limits its downward movement and thus prevents the corresponding passage 77 or 78 from becoming blocked. It will thus be appreciated that when fluid pressure is present in either or both of the connections 71 and 72 the corresponding pair or pairs of plungers press upwardly upon the piston valve member 51, so opposing the spring 69 with a force which is proportional to the sum of the said fluid pressures.

The lid 66 of the reservoir 48 also supports an electric motor 84 driving a liquid pressure pump 85. The latter draws in liquid through an inlet pipe 86 and delivers said liquid under pressure through a pipe 87 to a pressure relief valve of the usual construction, indicated at 88. From thence the pressure liquid is taken through a pipe 89 which leads to the connection 54 of the relay valve 47 and also to the port 42 of the follower valve 28. The reservoir 48 also contains a drain pipe 90, which is joined to the connection 55 of the relay valve and which leads out of the reservoir to the port 43 of the follower valve. The groove 41 of the follower valve is connected by a pipe 91 leading through a control valve 92 to a pipe 93 connected with the lower working space 94 of the motor cylinder unit 13, 14; the pipe 93 also leads to the connection 71 of the relay valve 47. From the connection 72 of said valve a pipe 95 leads to the connection 60 and also to the upper working space 96 within the motor cylinder 13.

The control valve 92 comprises a body 97 having a bore 98 containing a piston valve member 99 operated by an external sliding handle 100. When the control valve is in the position shown, i. e., its normal working position, a circumferential groove 101 connects the pipe 93 with the pipe 91 as above mentioned, a branch 89a leading from the pipe 89 being closed by the left-hand end of the valve member 99; the action of moving the handle 100 to the left causes the pipe 91 to be stopped and connects the pipe 93 with the pipe 89, thus enabling pressure liquid from the supply to be fed directly to the lower working space 94 of the motor cylinder 13 for adjusting the height of the table 10.

It has been found in the case of the follower valve and also the relay valve that it is advantageous to allow a very slight, but nevertheless appreciable, leakage to take place past the central land 39 or 58, and for this purpose the slots 40 or 59 formed in the sleeve 36 or 50 are preferably arranged in the manner shown in Figure 5. The slots, which are three in number, are made as nearly as possible the same width as the central land 39 or 58, but each is cut in a very slightly oblique or helical direction so that the adjoining ends of each adjacent pair of slots are staggered by a distance A, as shown to a greatly exaggerated extent in Figure 5. In actual practice the distance A would be of the order of 0.001 inch, thus in effect making the extreme width of the slots, taken as a whole, approximately 0.001 inch greater than the width of the land 39 or 58. The obliquity of the slots gives, however, a gradual cut-off as the land moves away from a dead central position, thus stabilising the valve member and avoiding a tendency to chatter or vibrate.

The action of the hydraulic control system is as follows. The follower valve 28, which receives pressure liquid from the supply pump 85 through the pipe 89, controls the admission of said liquid to the working space 94 below the piston 14, the liquid in said working space normally being maintained at a pressure sufficient to sustain the weight of the table 10 and the parts associated therewith, as well as the downward force exerted by the pressure liquid in the upper working space 96. As the table 10 is moved in a horizontal plane, for example by means of the feed wheel 12, the follower 25 scans the surface of the pattern or model 24, with which it remains in contact, and consequently tends to rise and fall in sympathy with the variations in the surface of said pattern or model. For instance, if the follower 25 tends to rise, due to the increasing thickness of the pattern or model 24, the rod 27 raises the piston valve member 35, thus enabling the lower circumferential groove 38 of the follower valve to connect the pipe 91 (and consequently the lower working space 94) with the drain pipe 90; this, of course, reduces the pressure of the liquid in the lower working space 94 of the motor cylinder 13 and therefore allows the piston 14 to drop. The downward movement of the piston 14, and consequently the table 10, is assisted, however, by the action of the relay valve 47, which at the same time increases the pressure present in the upper working space 96.

This action is brought about as follows. The piston valve member 51 is normally held in its central position, as shown, by the combined action of the four plungers 79-82 pressing upwards in opposition to the spring 69. When, therefore, the liquid pressure in the lower working space 94 is reduced, the upward thrust upon the plungers 79 and 80 is correspondingly lessened and the spring 69 moves the piston valve member 51 in a downward direction. This connects the upper working space 96 of the motor cylinder 13 with the supply of pressure liquid by way of the pipe 95, the slots 59, the circumferential groove 52 and the port 56, so that the pressure in said upper working space 96 is increased. The increase is, however, limited, owing to the fact that the upward force exerted by the plungers 81 and 82 in the relay valve 47 correspondingly increases, and therefore, when the total upward thrust exerted by the four plungers 79-82 regains its original value, the piston valve member 51 is restored to its central or "off" position. From this it follows that if the plungers 79-82 are all equal in diameter, the increase of liquid pressure in the upper working space 96 is equal to the reduction of liquid pressure in the lower working space 94.

The lowering of the table 10, which is thus brought about hydraulically by the combined action of the follower valve 28 and the relay valve 47, restores the follower 25 to its original position level with the cutter 21, and the piston valve member 35 of the follower valve is thus returned to its intermediate or "off" position. As a consequence the pressure of the liquid in the lower working space 94 regains its original value, so that the total upward thrust of the plungers 79-82 becomes greater than normal; the piston valve member 51 is thus lifted slightly and the excess pressure within the upper working space 96 of the cylinder 13 allowed to escape through the connection 55 and into the reservoir.

The action which occurs when the follower 25 is allowed to fall due to a decrease in the thickness of the pattern or model 24 is the opposite to the above. The spring 44 moves the piston valve member 35 of the follower valve 28 downwardly, thus connecting the lower working space 94 of the motor cylinder 13 with the supply of pressure liquid in the pipe 90 and port 43. This increases the pressure within said lower working space 94 and at the same time causes the upward thrust of the plungers 79 and 80 in the relay valve 47 to be increased, so that the piston valve 51 is moved upwards and connects the upper working space 96 of the motor unit 13 with the interior of the reservoir 48 by way of the connection 55. As a result the pressure in the upper working space 96 falls until the piston valve member 51 of the relay valve is restored to its "off" position. The relay valve in this way serves to control the value of the sum of the liquid pressures in the two working spaces 94 and 96 of the motor cylinder 13, so that when one of these pressures is reduced the other is automatically increased to a corresponding extent and vice versa; this, of course, renders the piston 14 very responsive to the movements of the follower 25 and has the effect of improving the accuracy of the work produced by the cutter or equivalent 21.

A modified form of relay valve is illustrated diagrammatically in Figure 6, and comprises a body 102 having two cylindrical coaxial bores 103 and 104 forming a pair of chambers separated by a partition 105. A thrust rod 106 passes through a partition 105 in a liquid-tight manner and cooperates at one end with a piston 107 slidable within the bore 104, said piston being urged towards the left by a coiled compression spring 108 bearing against an abutment 109 which is adjustable by means of a screw 110. The other end of the thrust rod 106 has a plate 111 against which bears a compression spring 112, which serves to control the position of a piston valve member 51 similar in construction to the one shown in Figure 2. This piston valve member 51, which has a pair of circumferential grooves 52 and 53, with a land 58 between them, is urged towards the right by a coiled compression spring 113, and is arranged to control the flow of liquid between three ports 56, 57 and 59 axially spaced along the bore 103. The spring 113 is relatively weak compared with the two springs 108 and 112, which latter act in combination to urge the piston valve member 51 towards the left. The left-hand end of the bore 103 constitutes a working space 114, which is connected by a pipe 95 with the port 59 and also with the upper working space 96 of the motor unit (as in Figure 1); the ports 56 and 57 are connected with the pressure supply and with the reservoir respectively by a pipe 89 and 90; and the working space 115 between the piston 107 and the partition 105 is connected with the lower working space 94 of the motor unit by means of a pipe 93.

It will be seen that the liquid pressure within the working space 114 in effect opposes the force of both of the compression springs 112 and 108, and that the liquid pressure in the working space 115 acts in opposition to the spring 108. As a consequence an increase in pressure in the lower working space 94 of the motor unit causes the spring 108 to be counteracted to a corresponding extent, thus shifting the piston 107 towards the right and enabling the piston valve member 51 to move also towards the right. This tends to place the upper working space 96 of the motor unit into communication with the reservoir 48 of the system, and thus reduces the pressure in the said upper working space 96. As the pressure in the upper working space 96 decreases, so does the pressure in the working space 114 of the relay valve, so that the piston valve member 51 is returned to its centralised or "off" position. Similarly a reduction in the pressure of the working liquid in the lower working space 96 of the motor unit is accompanied by a corresponding reduction in the working space 115 of the relay valve, thus enabling the spring 108 to expand and move the piston valve member 51 to the left. This places the upper working space 96 of the motor unit into communication with the pressure supply, thus raising the pressure in the upper working space 96 of the motor unit and also the space 114 of the relay valve until the piston valve member 51 is returned to its centralised position.

It will be appreciated that the system which has been described is given by way of example and that various modifications are possible to suit requirements. Thus any suitable means may be used for operating the follower valve, and in one possible arrangement a bell-crank lever connects the follower with the valve member, adjustable stops being provided, if desired, to limit the movement of the valve member. Also the relay valve may take other forms, and it may be desirable in some cases to counterbalance the table 10 (or the tool and follower head 18, 19, 28, where this is arranged to move, the table 10 remaining stationary), thus reducing the load which is carried by the motor piston 14.

What we claim is:

1. In a duplicating machine including a pattern follower, a cutting tool and a work support, means for relatively moving the cutting tool and work support toward and away from one another in response to pattern controlled movement of the follower which comprises, a source of pressure fluid, a fluid reservoir; a double acting piston and cylinder unit having two working spaces and having its movable member connected to relatively move the work support and the cutting tool toward and away from one another, a valve housing, a conduit connecting said housing with one of the working spaces of the piston and cylinder unit, a conduit connecting said housing with said source, a conduit connecting said housing with said reservoir, valve means in said housing connected to move in response to displacement of the follower, from a neutral position closing the first named conduit, in one direction to establish communication between the source and the first named conduit and in the other direction to establish communication between the reservoir and the first named conduit, and a valve member which is operable separately from said valve means in response to fluctuation in pressure from a predetermined value in the first named conduit for establishing a passageway between the other working space of said piston and cylinder unit and said source upon decrease in pressure in said first named conduit and for establishing a passageway between said other working space of said piston and cylinder unit and said reservoir upon increase in pressure in said first named conduit.

2. In a duplicating machine including a pattern follower, a cutting tool and a work support, means for relatively moving the cutting tool and work support toward and away from one another in response to pattern controlled movement of the follower which comprises, a source of pressure fluid, a fluid reservoir, a double acting piston and cylinder unit having two working spaces and having its movable member connected to relatively move the work support and the cutting tool toward and away from one another, a valve housing, a conduit connecting said housing with one of the working spaces of the piston and cylinder unit, a conduit connecting said housing with said source, a conduit connecting said housing with said reservoir, valve means in said housing connected to move in response to displacement of the follower, from a neutral position closing the first named conduit, in one direction to establish communication between the source and the first named conduit and in the other direction to establish communication between the reservoir and the first named conduit, a valve body, conduits connecting said source and reservoir with the other working space of said piston and cylinder unit through said body, a piston valve in said body movable, from a normal position closing the conduits from said source and reservoir to said other working space, in one direction to establish connection between said source and said other working space and in the other direction to establish connection between said reservoir and said other working space, a conduit connecting one end of said body to a pressure zone common to that of the first named conduit so that the piston valve is urged in one direction by the pressure therein, and a spring acting on the other end of said piston valve in opposition to the fluid pressure, whereby upon a reduction in fluid pressure in said first named conduit below a predetermined value the spring will move the piston valve to establish connection between said source and said other working space while upon an increase in pressure in said first named conduit above said predetermined value said piston valve will be oppositely moved by the pressure fluid to establish connection between said reservoir and said other working space.

3. In a duplicating machine including a pattern follower, a cutting tool and a work support, means for relatively moving the cutting tool and work support toward and away from one another in response to pattern controlled movement of the follower which comprises, a source of pressure fluid, a fluid reservoir, a double acting piston and cylinder unit having two working spaces and having its movable member connected to relatively move the work support and the cutting tool toward and away from one another, a valve housing, a conduit connecting said housing with one of the working spaces of the piston and cylinder unit, a conduit connecting said housing with said source, a conduit connecting said housing with said reservoir, valve means in said housing connected to move in response to displacement of the follower, from a neutral position closing the first named conduit, in one direction to establish communication between the source and the first named conduit and in the other direction to establish communication between the reservoir and the first named conduit, a valve body, conduits connecting said source and reservoir with the other working space of said piston and cylinder unit through said body, a piston valve in said body movable, from a normal position closing the conduits from said source and reservoir to said other working space, in one direction to establish connection between said source and said other working space and in the other direction to establish connection between said reservoir and said other working space, one end of said valve body defining a plurality of like axially extending cylinders, a plurality of plungers connected to said piston valve and slidable in the respective cylinders of the valve body, a conduit connecting a pressure zone common to that of the first named conduit with some of the cylinders in said valve body, a conduit connecting a like number of the cylinders in said valve body with the other working space of said piston and cylinder unit, and a spring acting on the end of said piston valve remote from the end provided with plungers in opposition to said plungers whereby said other working space will be connected with either the source or reservoir depending upon whether the fluid pressure acting on the plungers overcomes or is overcome by the action of the spring upon fluctuation in pressure in the first named conduit from a predetermined value.

4. In a duplicating machine including a pattern follower, a cutting tool and a work support, means for relatively moving the cutting tool and work support toward and away from one another in response to pattern controlled movement of the follower which comprises, a source of pressure fluid, a fluid reservoir, a double acting piston and cylinder unit having two working spaces and having its movable member connected to relatively move the work support and the cutting tool toward and away from one another, a valve housing, a conduit connecting said housing with one of the working spaces of the piston and cylinder unit, a conduit connecting said housing with said source, a conduit connecting said housing with said reservoir, valve means in said housing connected to move in response to displacement of the follower, from a neutral position closing the first named conduit, in one direction to establish communication between the source and the first named conduit and in the other direction to establish communication between the reservoir and the first named conduit, a valve body defining coaxial, main and auxiliary chambers, a piston valve member in said main chamber, a piston in said auxiliary chamber having a thrust rod extending through a partition into the main chamber, a pair of compression springs disposed within the respective chambers and acting to urge the piston in opposite directions and cumulatively on the piston valve to urge it in one direction, a relatively weak spring acting on said piston valve in opposition to said pair, a conduit connecting said first named conduit to said auxiliary chamber so that the fluid under pressure in the first named conduit opposes the thrust of the spring in said auxiliary chamber, a conduit connecting the end of said main chamber to the other working space of the piston and cylinder unit so that the piston valve is urged against the thrust of said pair of springs by the pressure in said other working space, and conduits connecting said source and said reservoir to said other working space of the piston and cylinder unit through said auxiliary chamber and piston valve, said piston valve establishing communication between said source and said other working space upon displacement in one direction away from a normal position and establishing communication between said reservoir and said working space upon displacement in the other direction, the direction of displacement depending upon whether there is upward or downward fluctuation away from a predetermined pressure value in said auxiliary chamber.

5. A duplicating machine as claimed in claim 2 in which the valve body is provided with a central axial bore and has three axially spaced ports therein connected with the conduit leading to the source, with the conduit leading to the other working space of the piston and cylinder unit and with the conduit leading to the reservoir, respectively, and in which the piston valve is provided with a pair of axially spaced annular recesses each in permanent registry with the corresponding outer port, said piston valve member having a land of axial width substantially equal to the corresponding dimension of the intermediate port, said land being located between the recesses so as to close the intermediate port when the piston valve is in normal position.

6. A profile duplicating machine as claimed in claim 2 in which the valve body is provided with a central axial bore and has three axially spaced ports therein connected with the conduit leading to the source, with the conduit leading to the other working space of the piston and cylinder unit and with the conduit leading to said reservoir, respectively, and in which the piston valve is provided with a pair of axially spaced annular recesses each in registry with the corresponding outer port, said piston valve member having a land of an axial width substantially equal to the corresponding dimension of the intermediate port, said land being located between the recesses so as to substantially close the intermediate port when the piston valve is in neutral position, said intermediate port consisting of a plurality of slots which are together very slightly greater in axial width than the land on the piston member.

7. A profile duplicating machine as claimed in claim 1 in which the valve housing is provided with an axially extending central bore and three axially spaced ports connected with the conduit leading to the source, the conduit leading to one side of the piston and cylinder unit, and the conduit leading to said reservoir, respectively, and in which the valve means consists of a piston member slidable in the bore of the housing, said piston member being provided with a pair of axially spaced annular recesses each in registry with the corresponding outer port, said piston member having a land of an axial width substantially equal to the corresponding dimension of the intermediate port located between the recesses so as to substantially close the intermediate port when the piston valve is in neutral position.

EDWARD CLAUDE SHAKESPEARE CLENCH.
QUINTIN HEALEY CARLTON.